United States Patent [19]
Gasvoda

[11] Patent Number: 4,949,014
[45] Date of Patent: Aug. 14, 1990

[54] DEVICE FOR REGULATING LUMINOUS FLUX OF BATTERY POWERED HEADLAMP

[75] Inventor: David S. Gasvoda, Missoula, Mont.

[73] Assignee: The United States of America as represented by the Secretary of Agriculture, Washington, D.C.

[21] Appl. No.: 305,316

[22] Filed: Feb. 1, 1989

[51] Int. Cl.⁵ .......................................... H05B 37/02
[52] U.S. Cl. .............................. 315/158; 315/209 R; 315/291
[58] Field of Search .................... 315/76, 158, 209 R, 315/291, 307

[56] References Cited

U.S. PATENT DOCUMENTS 4,156,166  5/1979  Shapiro et al. ................ 315/209 R
4,238,709  12/1990  Wallace ............................. 315/291

Primary Examiner—Robert J. Pascal
Attorney, Agent, or Firm—William J. Connors; M. Howard Silverstein

[57] ABSTRACT

A low cost, highly efficient, lightweight device for regulating the luminous flux output of an incandescent headlamp as its battery supply voltage changes. The device maintains nearly constant output and allows nearly all of the energy capacity of the battery to be utilized. The device makes practical the use of low cost, readily available batteries to power wild land firefighter's headlamps. The output of an unregulated headlamp diminishes rapidly as the batteries discharge.

6 Claims, 3 Drawing Sheets

DEVICE FOR REGULATING LUMINOUS FLUX OF BATTERY POWERED HEADLAMP

BACKGROUND OF THE INVENTION

This invention relates to a small, lightweight, highly efficient portable device for regulating the luminous flux output of a battery powered headlamp. Wildland firefighters use a hard-hat mounted headlamp to provide illumination for night fire suppression activities. It is desirable to have the headlamp and battery both located on the hard-hat to eliminate the need for an interconnecting cord which could entangle in brush. The headlamp and battery must be lightweight so as to not burden the firefighter and the battery must contain sufficient energy to power the headlamp for a complete night shift. Also, the light output must remain sufficient to provide adequate illumination for safe working conditions.

Current headlamps are powered by four "D" size carbon-zinc cells which are carried on the belt and are connected to the hard-hat mounted headlamp by a cord. These cells are too heavy to be carried on the hard-hat. Batteries suitable for carrying on the hard-hat are the "D" size lithium-sulfur dioxide and the zinc-air pack. Both provide adequate capacity, are lightweight and have flat discharge characteristics to provide nearly constant illumination through their useful life. However, the lithium-sulfur dioxide cell cannot be transported on passenger carrying aircraft and Zinc-Air packs have not been manufactured in sufficient quantity to meet the demand.

Six "AA" size alkaline-manganese dioxide cells have adequate energy content. However, without regulation their steep discharge voltage curve causes the illumination from the headlamp to drop off at an unacceptable rate. Therefore, a switching power regulator is used to provide nearly constant luminous flux output.

Devices for regulating the output flux of a lamp are well known. For example, U.S. Pat. No. 4,156,166 issued May 22, 1979, discloses and claims an apparatus for regulating the output flux of a lamp powered by a degenerating source of power, the output of said lamp being maintained substantially constant over a range of voltages by switching the power supply to the lamp on and off on a controlled duty cycle. By use of this method safety devices give an output of constant light until a lower voltage level is reached by the regulated power supply compared with an unregulated power supply. However, while the devices described in the above Shapiro et. al. patent allow greater utilization of the power supply than use without regulation, a major drawback is the electrical efficiency of the system as defined by the ratio of the power out to the power in of the system. Shapiro et. al. circuits would net near zero energy savings since power to run the circuits would probably be near the increase in usable battery power resulting from use of the circuits. Thus, net energy savings would be minimal.

U.S. Pat. No. 4,238,709 to Wallace which issued on Dec. 9, 1980 describes a device for manual control of one output intensity of a battery powered lamp. As battery output decreases the lamp output must be manually adjusted to keep its output constant. The circuit is designed for a hard-hat mounted lamp with power derived from a belt worn power pack. The lamp on/off time is controlled by the duty cycle of an astable oscillator which is controlled by the manual setting of a potentimeter.

A requisite for increasing the electrical efficiency of a regulating device is to limit the number of power consuming elements in the regulating device as well as using components of minimum energy requirements. For instance the invention as outlined in FIG. 3b, the preferred embodiment of this invention has only six components and an electrical efficiency of 88%.

Accordingly, the objectives of the present invention are to provide a highly energy efficient, light weight, compact, simple power switching device for battery powered helmet mounted headlamps, flashlights, or the like. The operation of the device provides a net increase in the useful utilization of the battery energy as compared to heretofore used devices and thereby increased battery life.

SUMMARY OF THE INVENTION

Figure 2:
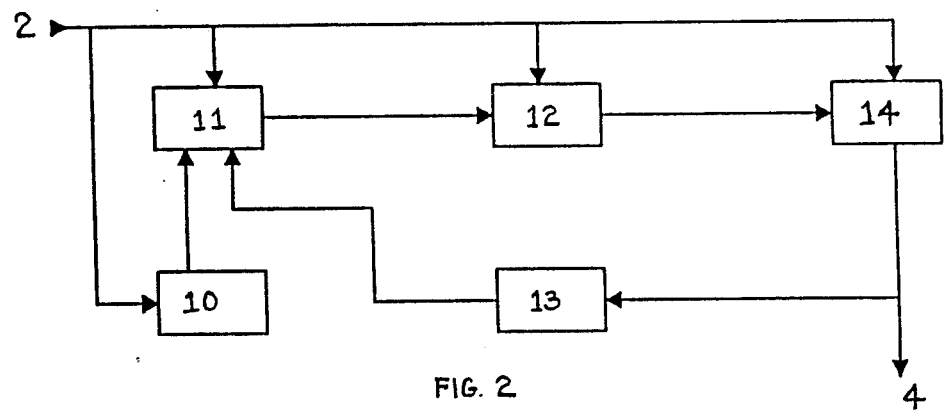
FIG. 2 is a diagrammatic sketch of the regulator.
Figure 1:
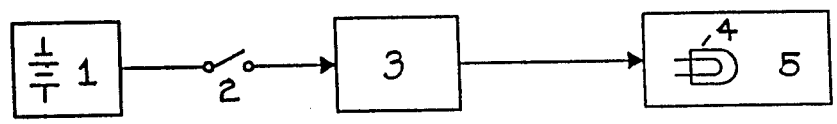
FIG. 1 is a diagrammatic sketch of the electronically regulated firefighter's headlamp.

Referring to FIG. 1, a battery 1 supplies power through power switch 2 to a switching power regulator 3 which provides nearly constant average power to lamp 4. The lamp 4 provides the illumination for the headlamp 5. As seen in FIG. 2, the regulator 3 consists of a power switching device 14 which rapidly switches on and off the power from the battery 1 to the lamp 4. The power switching device 14 is controlled by the pulse width modulator 12 in order to control the average power going to the lamp 4 by varying the on-time to off-time ratio. The time ratio output of the pulse width modulator 12 is controlled by the voltage comparator 11 which compares the voltage from the reference 10 to the voltage from the feedback network 13. The feedback network 13 provides a voltage which is proportional to the lamp 4 power.

DETAILED DESCRIPTION

Figure 3B:
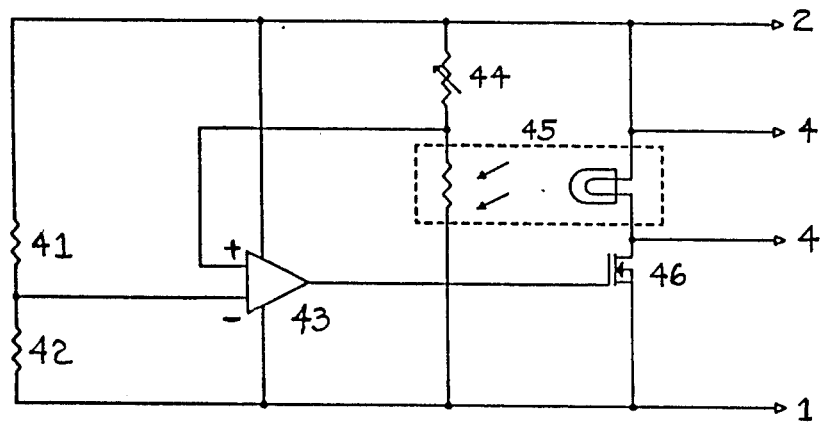
FIG. 3b is a schematic diagram of a regulator with an optoisolator that uses a paralleled sense lamp optically coupled to a photoresistor as the feedback element.
Figure 3A:
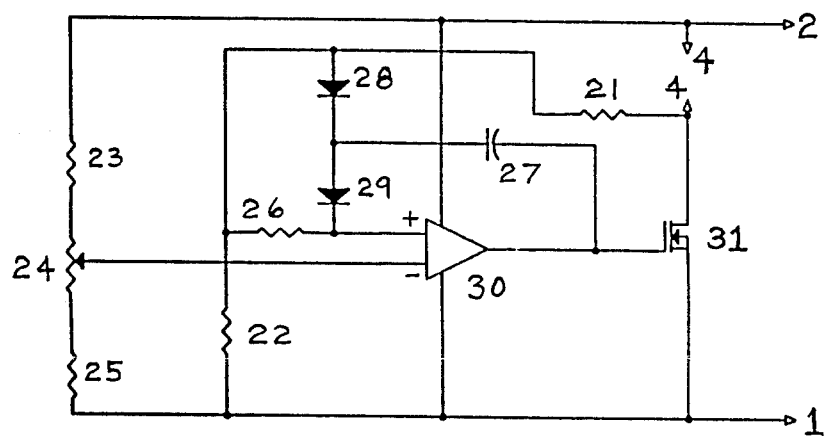
FIG. 3a is a schematic diagram of a regulator which uses the resistance of the lamp filament as the feedback element.

A. FIG. 3a is a schematic of a circuit which utilizes the filament resistance of the lamp 4 to sense the lamp 4 power. The more power flowing to the lamp, the higher the filament temperature becomes and thus, the higher the filament resistance. The filament resistance of the lamp 4 along with the resistors 21 and 22 comprise the feedback network 13. Thus, the voltage at the junction of resistors 21 and 22, as referenced to the negative battery 1 terminal, is inversely proportional to the lamp 4 filament resistance and power. The reference 10 is the voltage divider consisting of the resistor 23, trim potentiometer 24 and the resistor 25. The reference voltage is derived at the wiper of the potentiometer 24. This provides a small adjustment of the average lamp power in order to compensate for component tolerances. The operational amplifier 30 serves as both comparator 11 and part of the pulse width modulator 12. The diodes 28 and 29, resistor 26 and capacitor 27 are also components of the pulse width modulator 12. The metal-oxide semiconductor field-effect transistor (MOSFET) 31 is the power switching device 14.

The circuit shown in FIG. 3a functions as described below:

When the power switch 2 is closed, battery voltage is applied to the operational amplifier 30. The capacitor 27 and diode 29 provide a positive feedback for the operational amplifier 30. The output of the operational amplifier 30 initially goes high. This burns on the MOSFET 31 and applies power to the lamp 4 by pulling the junction of the lamp 4, resistor 21 and drain of MOSFET 31 low. The capacitor 27 charges through the diode 29, resistor 26, resistor 21 and resistor 22. As the capacitor 27 charges, the voltage at the non-inverting input of operational amplifier 30 drops. When this voltage reaches level at the inverting input of the operational amplifier 30, the output of the operational amplifier 30 goes low. This turns off the MOSFET 31 and the power to lamp 4. The capacitor 27 discharges and charges in the opposite direction through the diode 28 toward the voltage established by the feedback network 13. Because the resistance of the resistor 26 is very small compared to the input resistance of the operational amplifier 30, the voltage at the junction of the diode 28 and the resistors 21, 22 and 26 also appears at the non-inverting input of the operational amplifier 30. As the capacitor 27 charges, this voltage increases until it becomes slightly greater than the reference voltage of the inverting input of the operational amplifier 30. Then, the output of the operational amplifier 30 returns high and the above cycle is repeated. As the lamp 4 filament heats up, its resistance increases. This results in a lower voltage at the output of the feedback network 13; i.e., the junction of the resistors 21, 22, 26 and the diode 28. The time for the capacitor 27 to charge through the diode 28 increases largely because of the nonlinear current versus voltage characteristics of the diode 28. The result is that output of operational amplifier 30 remains low for a longer time. Therefore, the MOSFET 31 is off longer. Thus, the average power going to the lamp 4 is reduced. An equilibrium is reached when the lamp 4 filament temperature causes the output of the feedback network 13 to equal the reference 10. As the battery 1 discharges and its voltage decreases, the ratio of the power switching device 14 off-time to on-time decreases such that the lamp 4 filament temperature is held nearly constant.

B. FIG. 3b, the preferred embodiment of the invention, is a schematic of a circuit which utilizes an optoisolator comprising an incandescent lamp coupled to a photoresistor 45 to regulate the power flowing to the lamp 4. The optoisolator is available from EG&G Vactec. Because the lamp 4 is in parallel with the lamp portion of 45, the voltage applied to each is equal. By maintaining this root-mean-squared (rms) voltage constant, the power going to the lamp 4 is constant because the lamp 4 resistance is constant for a given power. The power to the lamp 4 is the rms voltage squared divided by the lamp 4 resistance. The light output of the lamp portion of 45 is proportional to the power which is equal to the rms voltage squared divided by the lamp resistance. The lamp portion of 45 is chosen such that its power used is smaller than the power used by lamp 4. This light output is coupled to the photoresistor portion of 45. The resistance of the photoresistor decreases as the light intensity increases. The lamp coupled to a photoresistor 45 along with the trimmer potentiometer 44 comprise the feedback network 13. Thus, the voltage at the junction of trimmer potentiometer 44, the photoresistor portion of 45 and the operational amplifier non-inverting input 43, as referenced to the negative battery 1 terminal, is proportional to the resistance of the photoresistor. The trimmer potentiometer is used to set the lamp 4 rms voltage. The reference 10 is the voltage divider consisting of the resistor 41 and the resistor 42. The operational amplifier 43 serves as both the comparator 11 and pulse width modulator 12. The metal-oxide semiconductor field-effect-transistor (MOSFET) 48 is the power switching device 14.

The circuit shown in FIG. 3b functions as described below:

When the power switch 2 is closed, the battery 1 voltage is applied to operational amplifier 43. Because the photoresistor portion of 45 is initially dark, its resistance is high and the voltage at the junction of the photoresistor, trimmer potentiometer 44 and the non-inverting input of operational amplifier 43 is higher than the voltage at the reference junction of the resistor 41, resistor 42 and the inverting input of operational amplifier 43. Therefore, the output of operational amplifier 43 is high and the MOSFET 46 is turned on. This applies battery voltage across the lamp portion of 45. When the lamp filament heats up and emits sufficient light to decrease the resistance of the photoresistor portion of 45, the voltage at the non-inverting input of operational amplifier 43 decreases to less than the voltage at the inverting input. The output of the operational amplifier 43 goes low turning off MOSFET 46 and removing the battery 1 voltage from the lamp portion of 45. The filament cools and the light decreases. This causes the resistance of the photoresistor to increase and increases the voltage at the non-inverting input of operational amplifier 43. When this voltage exceeds the reference voltage at the inverting input, the output of the operational amplifier 43 again goes high and the cycle repeats. Pulse width modulation occurs because the lower the battery 1 voltage is; the less power goes to the lamp portion of 45 and the filament takes longer to heat up. This causes the ratio of the on-time to off-time to increase.

What is claimed:

1. An apparatus for maintaining a constant luminous flux output from a battery powered lamp in which the battery voltage decreases with time and which apparatus increase the life of the battery, the apparatus having a comparator means for comparing the voltage values of a reference device means and a feedback loop means, said voltage values being proportional to battery voltage and lamp power respectively, the comparator means output controlling the off-time/on-time pulse ratio of a pulse width modulator means and the off/on pulse outputs of said modulator means controlling a power switch means for turning power to the lamp from the battery off and on in a duty cycle which keeps power to the lamp nearly constant with time, the improvement comprising:
 a feedback loop means comprising an optoisolator means and trimmer potentiometer.

2. An apparatus as defined in claim 1 wherein said optoisolator means comprise an incandescent lamp coupled to a photoresistor.

3. A switching power regulator for providing nearly constant power to a lamp of a battery powered lamp whereby the luminous flux output of said lamp is maintained nearly constant over the period of life of the battery in which battery terminal voltage decreases with time and wherein battery energy capacity is nearly totally and efficiently utilized, the regulator comprising:

a power switching means to switch power from said battery to said lamp on and off, the ratio of on-time/off-time of said switching means and thus power reaching said lamp being defined by the duty cycle of said switching means, said duty cycle being regulated by the output signal of a pulse width modulator means, the output signal of said modulator means being defined by the output signal of a comparator means input thereto, the comparator means output signal being the compared values of a reference device means signal and a feedback loop means signal input thereto, the feedback loop comprising an optoisolator and a trimmer potentiometer, the on-time off-time ratio of said power switching means increasing with time.

4. A switching power apparatus as defined in claim 3 further comprising a comparator means and pulse width modulator means housed in a common operational amplifier.

5. The power switch apparatus as defined in claim 4 further comprising a reference device having at least two resistors.

6. The power switch apparatus as defined in claim 5 wherein said optoisolator is comprised of an incandescent lamp coupled to a photoresistor.

* * * * *